No. 859,082. PATENTED JULY 2, 1907.
M. KENTER.
CHAIN CONNECTING LINK.
APPLICATION FILED MAR. 30, 1906.
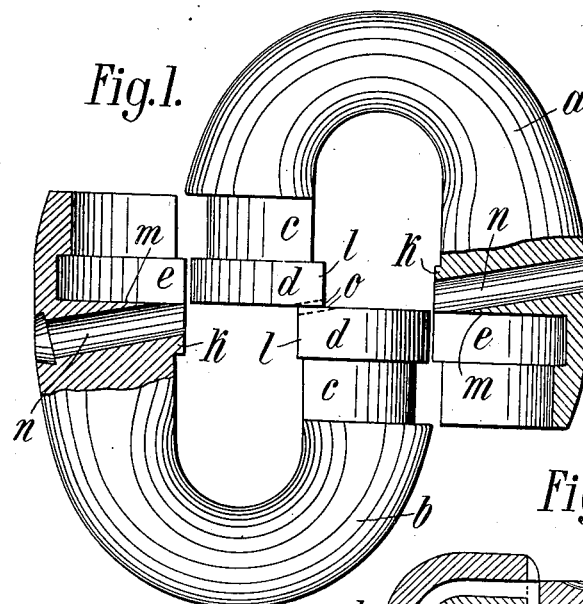
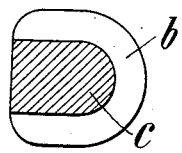
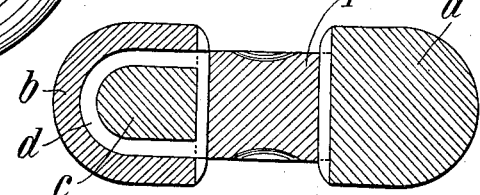
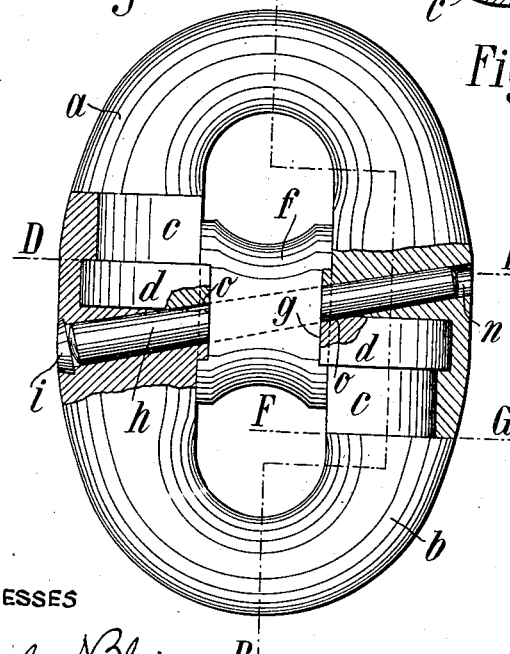
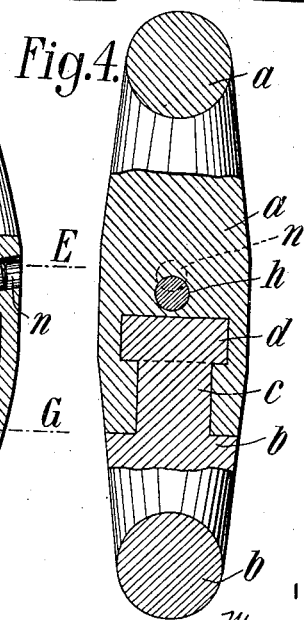
WITNESSES
Paul A Blair
Walter Ast
INVENTOR
Max Kenter
BY
Howson and Howson
ATTORNEYS

UNITED STATES PATENT OFFICE.

MAX KENTER, OF BERLIN, GERMANY.

CHAIN-CONNECTING LINK.

No. 859,082.         Specification of Letters Patent.         Patented July 2, 1907.

Application filed March 30, 1906. Serial No. 308,933.

*To all whom it may concern:*

Be it known that I, MAX KENTER, a subject of the King of Prussia, residing in Berlin W., Landshuterstrasse 6, Germany, have invented certain new and useful Improvements in Improved Chain-Connecting Links, of which the following is a specification.

The chain connecting-link according to the present invention is intended to be used instead of the shackles which have hitherto been employed and also to serve as an emergency link when the link of a chain has broken. It consists of two similar hook-shaped halves. Each symmetrical half possesses shanks the total length of the one being greater than that of the other. Moreover apart from the tenon and the recess the one shank is longer than the other, that is, those parts of the shank which form the outside of the assembled link are of unequal length. Each of these link-halves is provided at its shorter end with a tenon having one or more collars or shoulders, while the other longer end is enlarged and is so milled out that the tenon of the other link-half can be inserted into it sidewise. In this way the collar of the tenon is clasped round on three sides and thus such a firm connection can be made that it is impossible for it to come undone on account of an elastic alteration of the shape of the material when the same is subjected to tension. The two link-halves are held firmly together by means of a bridge-piece inserted sidewise into the link, and said bridge-piece at the same time increases the tensile strength of the link. In order to prevent the bridge-piece from falling out, a conical bolt or pin is stuck transversely through the whole link and the bridge-piece, and said pin is obliquely arranged in such a way that the holes bored for the same penetrate those parts of the link-halves which are not in themselves already weakened by the tenons and the recesses for the connection. By means of the arrangement a further weakening of the connection by means of the tenon is avoided.

A link constructed according to the present invention is illustrated in the accompanying drawing, in which:—

Figure 1 shows in part sectional side elevation the disjointed link-halves ready in position for being slipped into engagement with one another. Fig. 2 shows in part sectional side elevation the assembled link. Fig. 3 is a cross-section on the line D—E of Fig. 2. Fig. 4 is a cross-section on the line A—B of Fig. 2. Fig. 5 is a cross-section on the line F—G of Fig. 2.

Referring to Fig. 1, when the two link-halves $a$ and $b$ are slipped or joined together each tenon $c$ slides from within in such a way into the recess $e$ of the other link-half that its collar or shoulder $d$ is firmly held in the direction of the pull in the chain. The bridge-piece $f$ is provided with grooves $g$ into which the projections $k$, $k$ and $l$, $l$ of the link-halves project as shown in Fig. 2. This bridge-piece is secured in position by means of the bolt or pin $h$. A conical plug $i$ of lead prevents the pin $h$ from falling out. The holes $n$ for the pin $h$ intersect the inner edges of the bearing surfaces $m$ so that in case the bridge-piece is absent the pin prevents the tenons from slipping out of their recesses, the inner edges of the collars $d$ being provided with grooves $o$ into which the pin fits.

The advantage of the new chain connecting-link as compared with well known forms consists in the two link-halves engaging directly in one another and in the secure bridge-piece held firmly by means of the conical pin holding them in position. As all the members for securing the link-halves in engagement are so arranged that the forces which come into play cannot have a loosening action in their direction, the link is exceptionally well protected against the danger of becoming unintentionally open. Moreover on account of the fact that a special locking portion is not employed it is possible so to shape the connecting-link that apart from unimportant details, such as the strengthening of the longitudinal sides and the somewhat greater breadth of the whole link, it corresponds to the other chain-links, particularly with regard to shape. Consequently the individual links can move easily upon one another, and moreover the construction of the capstan-drum on which the chain is wour can be considerably simplified.

What I claim as my invention and desire to secure by Letters Patent, is:—

1. A chain-connecting link, comprising in combination two symmetrical half-links adapted to slide into and hook into one another, each of said half-links having shanks of unequal length, a detachable bridge-piece adapted to hold said half-links in position, and a pin for securing said bridge-piece in position, substantially as and for the purpose set forth.

2. A chain connecting link, comprising in combination two symmetrical half-links adapted to slide into and hook into one another, each of said half-links having shanks of unequal length and each having at its shorter shank one or more shoulders and at its longer shank a recess therefor, a detachable bridge-piece adapted to hold said half-links in position, and a pin for securing said bridge-piece in position, substantially as and for the purpose set forth.

3. A chain connecting-link comprising in combination two symmetrical half-links adapted to slide into and hook into one another, each of said half-links having shanks of unequal length to enable, the two half-links to be easily slid into engagement with one another and to allow the greater part of all the external forces acting on the link to tend to close the same, the one shank being provided with a tenon having a groove at the inner edge of its bearing surface and the other with a recess for the reception of the tenon on the other link-half, a detachable bridge-piece adapted to hold said half-links in position, and a pin for securing said bridge-piece in position, said pin being obliquely arranged in such a way that the holes bored for it pass through the sides of the link at places which are not weakened by the tenons and recesses, and the tenons through being provided with grooves in which the pin engages being prevented from sliding off their seats even if the bridge-piece is absent, substantially as and for the purpose set forth.

In testimony whereof I have signed my name to this specification, in the presence of two subscribing witnesses.

MAX KENTER.

Witnesses:
 JOHANNES HEIN,
 HENRY HASPER.